Nov. 7, 1967     E. C. MITCHELL     3,350,808
GOOSE DECOY
Filed July 14, 1965
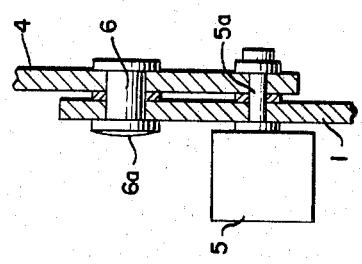
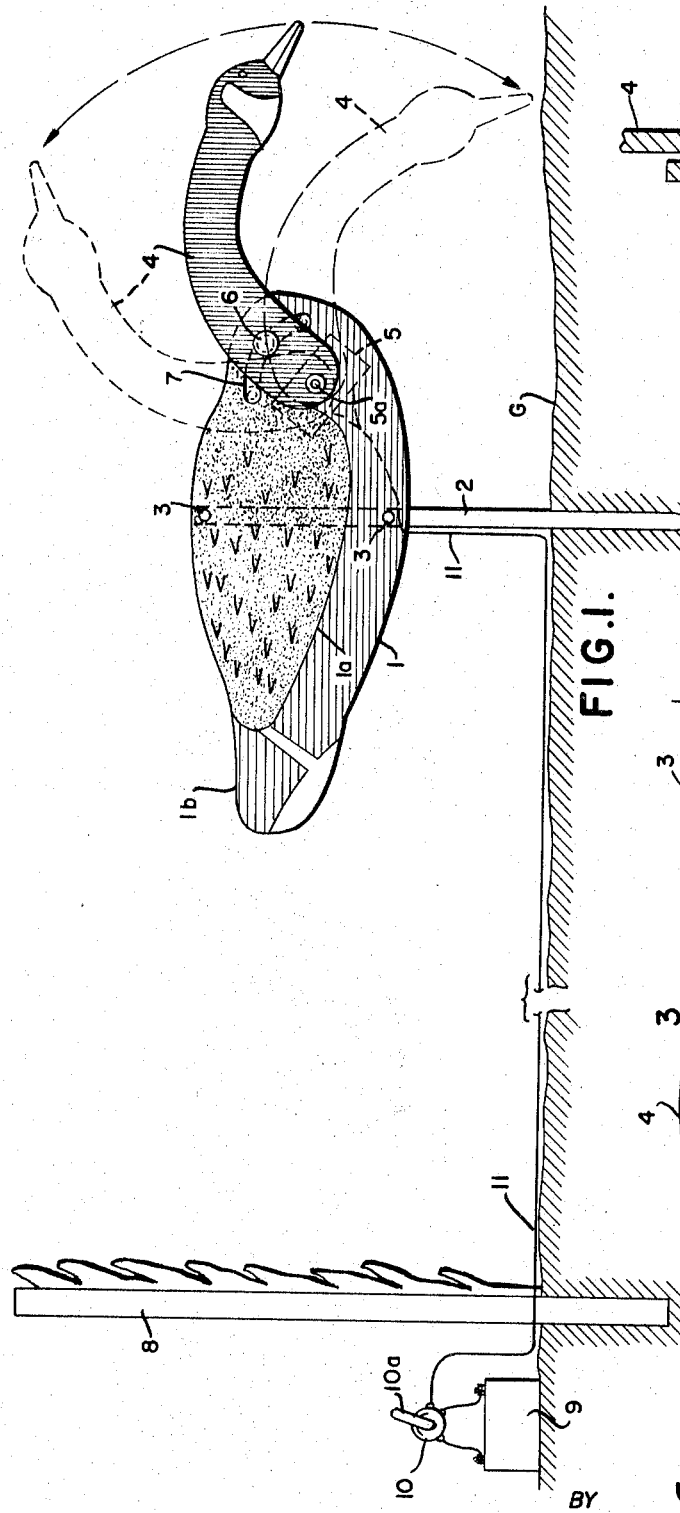
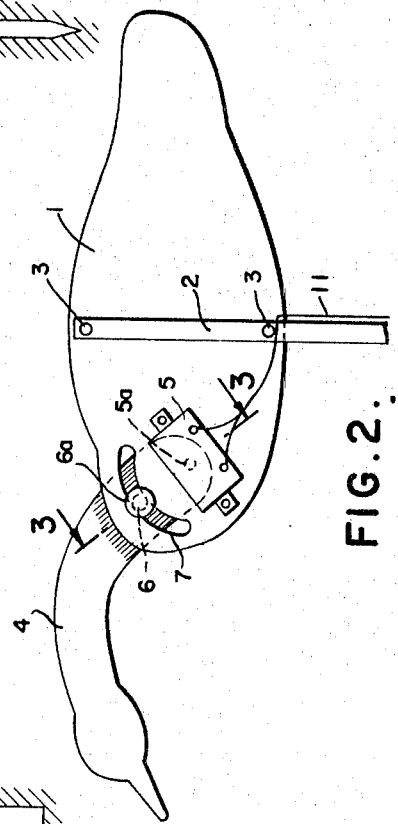
INVENTOR
Edward C. Mitchell
ATTORNEYS

3,350,808
GOOSE DECOY
Edward C. Mitchell, R.D. 4, Little Creek, Del. 19961
Filed July 14, 1965, Ser. No. 471,905
8 Claims. (Cl. 43—3)

This invention is a mechanical silhouette goose decoy having a body made of plywood which has been cut to conform with and resemble the profile of a goose, and the body of the decoy being anchored and supported above the ground by means of a steel spike, and the body of the decoy being painted or ornamented to resemble the natural coloring of a wild goose. The neck of the decoy is also shaped to resemble the neck and head of a wild goose and is further designed as a separate unit to pivot or swing up and down in a vertical plane at the neck end of the body, the neck being oscillated by a small D.C. battery-operated oscillating motor to which the neck is attached and which oscillates the neck on the body on the same principle as a car windshield wiper arm, the motor being remotely controlled from a rheostat switch and a battery located behind a nearby goose blind or pit where the hunter is also concealed, the switch and battery being connected in circuit with the motor by wire leads which are preferably colored olive drab, and the speed of movement or oscillation of the neck being regulated by the rheostat switch. However, when no wild geese are flying near the decoy the switch can be turned off to preserve the life of the battery.

Goose silhouette decoys having no moving parts are widely used by hunters, and each blind or pit may have anywhere from twenty to one hundred decoys around it. But such decoys are ordinarily unsatisfactory to act as lures for wild geese since they ordinarily are rigid and have no moving parts. However, the mechanical silhouette goose decoy which I have designed in fact has a moving or oscillating neck and head which moves up and down in a vertical plane resembling a feeding goose. Several of my novel decoys with moving necks could be intermingled with the customary group of rigid decoys to give the appearance of movement within the whole group.

I will explain the invention with reference to the accompanying drawing which illustrates one practical embodiment thereof to enable others familiar with the art to adopt and use the same, and will summarize in the claims the novel features of construction, and novel combinations of parts, for which protection is desired.

In said drawing:

FIG. 1 is a front elevational view of my novel goose decoy showing same mounted on a stake adjacent the ground surface; also showing the goose pit or blind adjacent to the decoy, and showing the switch and battery behind the blind which operates the vertically swingable neck of the decoy.

FIG. 2 is a rear elevational view of the decoy shown in FIG. 1, detached, showing the working parts.

FIG. 3 is an enlarged section on the line 3—3, FIG. 2.

As shown in the drawing, my novel decoy comprises a body portion 1 preferably made of plywood or the like cut to resemble the profile of the body of a goose, as shown in FIGS. 1 and 2, the front face of the body being painted or otherwise ornamented to resemble the natural coloring of the body of a wild goose, same having a wing resembling portion 1a and tail resembling portion 1b.

Preferably the body portion 1 is mounted on a vertical stake 2 by means of screws 3 or the like, the stake having a pointed lower end whereby the body 1 may be conveniently mounted or maintained somewhat above the ground surface G.

The neck and head portion 4 of the decoy, however, is a unit formed separately from the body portion 1 and is cut to conform with the shape of the neck and head of a goose and is correspondingly ornamented. The lower or inner end of the neck portion 4 is mounted on the oscillating shaft 5a of an electric windshield motor 5, which motor 5 is mounted on the back face of the body 1 adjacent the base of the neck portion, as shown in FIGS. 1 and 2, the neck portion 4 operating similarly to the wiper arm of a windshield wiper for automobiles.

In the neck portion 4 above the shaft 5a is a laterally extending pin 6 which operates in an arcuate slot 7 formed in the body portion 1 coaxially of the shaft 5a, pin 6 having a head 6a on its outer end engaging the back face of the body 1 for maintaining the neck portion 4 during its oscillation always parallel with the body portion 1 while permitting the neck portion 4 to be oscillated up-and-down, as indicated in dotted lines in FIG. 1, when the motor 5 is actuated to simulate a feeding goose.

A goose blind 8 (FIG. 1) is preferably utilized in connection with the decoy or a group of decoys, same being spaced from the group behind which blind 8 the hunter would conceal himself while hunting. Behind the blind 8 is an electric battery 9 of any type, and a rheostat switch 10 operated by a handle 10a, the terminals of the switch 10 being connected by wires 11 to the terminals of the motor 5, as shown in FIGS. 1 and 2, whereby the motor 5 may be actuated by turning the switch handle 10a, the rapidity of oscillation of the neck 4 being controlled by the setting of the switch handle 10a. When no wild geese are flying near the decoy the switch 10 can be turned off to preserve the life of the battery 9.

Goose silhouette decoys are widely used by hunters and each blind 8 or pit may have from twenty to one hundred decoys located around it. The use of a small number of my novel mechanical silhouette goose decoys intermingled with a group of ordinary decoys having no moving parts will give to the entire group of decoys the appearance of movement within the whole group; and thus the use of my decoys either alone or in a group of decoys which do not have moving parts such as necks or heads, will greatly enhance the possibility of attracting wild geese to the vicinity of the goose blind 8.

I do not limit my invention to the exact form shown in the drawing, for obviously changes may be made therein within the scope of the claims.

I claim:

1. A mechanical silhouette decoy comprising, a body portion having the profile of the body portion of a bird; means for mounting the body portion above the surface of the ground, a neck portion separate from the body portion having the profile of the neck and head portion of said bird; an oscillating motor mounted on the body portion adjacent the base of the neck portion, said motor having an oscillating shaft carrying the neck portion to simulate a feeding bird; and a battery and a switch connected in series with said motor for controlling the oscillatory movement of the neck portion.

2. In combination with a decoy as set forth in claim 1, a bird blind for a huntsman disposed in the vicinity of the decoy; and the battery and switch being disposed behind the blind.

3. A mechanical silhouette decoy comprising a body portion having the profile of the body portion of a bird; means for mounting the body portion above the surface of the ground; a neck portion separate from the body portion having the profile of the neck and head portion of said bird; an oscillating motor mounted on the body portion adjacent the base of the neck portion, said motor having an oscillating shaft carrying the neck portion; means for maintaining the neck portion parallel with the body portion while permitting oscillation thereof to simulate a feeding bird; and a battery and a rheostat switch connected in series with said motor for controlling the speed of the oscillatory movement of the neck portion.

4. In a decoy as set forth in claim 3, said maintaining means comprising a lateral pin on the neck portion offset from the motor shaft engaging an arcuate slot in the body portion concentric with the shaft; and said pin having a head engaging the outer face of the body portion adjacent the slot.

5. In combination with a decoy as set forth in claim 3, a bird blind for a huntsman disposed in the vicinity of the decoy; and the battery and switch being disposed behind the blind.

6. A mechanical silhouette decoy comprising a body portion having the profile of the body portion of a bird and having its front face ornamented to resemble the natural coloring of the body of said bird; means for mounting the body portion above the surface of the ground; a neck portion separate from the body portion having the profile of the neck and head portion of said bird and having its front face correspondingly ornamented; an oscillating motor mounted on the back face of the body portion adjacent the base of the neck portion, said motor having an oscillating shaft carrying the neck portion; means for maintaining the neck portion parallel with the body portion while permitting oscillation thereof to simulate a feeding bird; and a battery and a rheostat switch connected in series with said motor for controlling the speed of the oscillatory movement of the neck portion.

7. In a decoy as set forth in claim 6, said maintaining means comprising a lateral pin on the neck portion offset from the motor shaft engaging an arcuate slot in the body portion concentric with the shaft; and said pin having a head on its outer end engaging the outer face of the body portion adjacent the slot.

8. In combination with a decoy as set forth in claim 6, a bird blind for a huntsman disposed in the vicinity of the decoy; and the battery and switch being disposed behind the blind.

References Cited

UNITED STATES PATENTS

| | | | |
|---|---|---|---|
| 1,728,317 | 9/1929 | Wallace | 40—106.41 |
| 2,434,335 | 1/1948 | Signalness | 43—3 |
| 2,480,390 | 8/1949 | Thompson | 43—3 |
| 2,535,445 | 12/1950 | Miller et al. | 43—3 |
| 2,835,064 | 5/1958 | Webb | 43—3 |

SAMUEL KOREN, *Primary Examiner.*

WARNER H. CAMP, *Examiner.*